(12) United States Patent
Fukushima et al.

(10) Patent No.: US 6,338,799 B1
(45) Date of Patent: Jan. 15, 2002

(54) METHOD FOR RECOVERING PHOSPHATE FROM SLUDGE AND SYSTEM THEREFOR

(75) Inventors: Yuichi Fukushima; Tadashi Matsumoto, both of Omiya; Kouichi Kawabata, Tokyo, all of (JP); Katsumi Moriyama, 1-10-2 Mainosato, Koga, Fukuoka 811-3114 (JP)

(73) Assignees: Mitsubishi Materials Corporation, Tokyo; Katsumi Moriyama, Fukuoka, both of (JP)

( * ) Notice: Subject to any disclaimer, the term of this patent is extended or adjusted under 35 U.S.C. 154(b) by 0 days.

(21) Appl. No.: 09/437,134

(22) Filed: Nov. 10, 1999

(30) Foreign Application Priority Data

Nov. 11, 1998 (JP) .......................................... 10-321051
Jul. 2, 1999 (JP) .......................................... 11-189752

(51) Int. Cl.$^7$ .................................................. C02F 9/00
(52) U.S. Cl. ...................................... 210/631; 210/714
(58) Field of Search .................................. 210/714, 631

(56) References Cited

U.S. PATENT DOCUMENTS 3,716,484 A * 2/1973 Lincoln
3,965,002 A * 6/1976 Magnusson
4,389,317 A * 6/1983 Trentelman
6,113,788 A * 9/2000 Molof

FOREIGN PATENT DOCUMENTS

JP 10-321051 12/1998
JP 11-189752 7/1999

* cited by examiner

Primary Examiner—Chester T. Barry
(74) Attorney, Agent, or Firm—Oblon, Spivak, McClelland, Maier & Neustadt, P.C.

(57) ABSTRACT

A method for recovering phosphate from sludge includes the processes of treating sludge drawn from a water treatment system at a sewage treatment plant in an anaerobic condition to release polyphosphate accumulated in the sludge into solution, and recovering phosphate in the solution using a seed crystal material. A system for recovering phosphate from sludge includes a phosphorus-releasing means for treating sludge drawn from a water treatment system at a sewage treatment plant in an anaerobic condition to release phosphate into the bulk liquid, a dewatering and separating means for separating the sludge containing the solution including the released phosphate into dewatering effluent and dewatered sludge, a calcium ion concentration-adjusting means for adjusting the calcium ion concentration in the dewatering effluent, a pH-adjusting means for adjusting the pH of the dewatering effluent, and a crystallizing means for recovering phosphate from the calcium ion concentration-adjusted, pH-adjusted effluent of dewatering apparatus.

10 Claims, 8 Drawing Sheets

*1 Raw sludge and waste sludge may be thickened separately.

*2 Anaerobic digestion tank may be provided between thickener and dewatering apparatus.

EXPERIMENTAL RESULTS OF PHOSPHATE RECOVERY BY CRYSTALLIZING FOR DEWATERING EFFLUENT FROM MIXED SLUDGE BY CENTRIFUGAL DEWATERING

Experimental Conditions
A: Preliminary use of calcium silicate hydrate as seed crystal material
   (no control on pH)
B: pH 7.5
C: pH 8.0
D: pH 8.5

METHOD FOR RECOVERING PHOSPHATE FROM SLUDGE AND SYSTEM THEREFOR

BACKGROUND OF THE INVENTION

1. Field of the Invention

The present invention relates to methods for recovering phosphate from sludge when sewage is treated using activated sludge at sewage treatment plants, in which, by treating waste sludge or mixed sludge of waste sludge and sludge from primary settling basins in an anaerobic condition, phosphate contained in the waste sludge are released into solution, and phosphate in the solution are recovered. The invention also relates to systems for recovering phosphate from sludge.

2. Description of the Related Art

In order to control water pollution in rivers, lakes, and enclosed coastal sea areas, sewage treatment plants for treating industrial and municipal sewage have been built in many places.

FIG. 9 shows an example of a system for treating sewage and sludge conventionally adopted in such sewage treatment plants.

With respect to sewage received at a plant, first, sand, coarse refuse, etc., are removed at a sand separation basin. Next, suspended solids are settled in a primary settling basin, and supernatant is obtained. The supernatant is treated in a biological reaction tank in an aerobic condition, using activated sludge. Organic substances in the supernatant are primarily removed thereby.

Next, in a secondary settling basin, mixed liquor suspended solids are separated into activated sludge and treated water. The activated sludge is fed to a subsequent stage, and the separated treated water is discharged from the plant as effluent.

The separated activated sludge is separated into return sludge and waste sludge. The return sludge is returned to the biological reaction tank and is reused as activated sludge. The waste sludge is treated in a sludge treatment system.

The waste sludge generated in the water treatment system and sludge from the primary settling basin (raw sludge), which is settled in the primary settling basin, are thickened individually or as a mixture of both in the sludge treatment system, and separation between thick sludge and liquid separated by thickening is achieved. The liquid separated by thickening is returned to the water treatment system. The separated thick sludge is subjected to dewatering treatment and is separated into liquid separated by dewatering and dewatered sludge. The liquid separated by dewatering is returned to the water treatment system as sidestreams. The separated dewatered sludge is disposed of in landfills, by incineration, or other appropriate methods.

However, in the conventional treatment method described above, the following problems may occur. That is, the treated water contains substances, such as phosphorus and nitrogen, which are responsible for eutrophication. Therefore, the treated water is a contributing factor to red tide and the like in lakes, enclosed coastal sea areas, etc.

As a countermeasure against the above, in the water treatment system described above, an anaerobic tank may be provided before the aerobic biological reaction tank. Thereby, activated sludge accumulates phosphate (orthophosphate ions) as polyphosphate, and the phosphorus concentration in the effluent is reduced.

After the activated sludge which has accumulated polyphosphoric acid is withdrawn as waste sludge into the sludge treatment system, phosphate may be released from the waste sludge depending on a thickening method, resulting in increases in the phosphate concentration in the liquid separated by thickening and liquid separated by dewatering.

The liquid separated by thickening and liquid separated by dewatering having increased phosphate concentrations are returned to the water treatment system as sidestreams. As a result, effects of reducing the phosphorus concentration in the effluent are reduced.

An anaerobic digestion tank may be provided subsequently to a thickener. In such a case, when digested sludge which has been digested at the anaerobic digestion tank is transported to a dewatering apparatus, reactions take place among phosphorus, magnesium ion, ammonia, etc., released into the solution by anaerobic digestion, and magnesium ammonium phosphate crystals, i.e., struvite are precipitated in pipes and pumps. As the precipitation progresses, accidents such as clogging of the sludge transport facility may occur.

In order to overcome the problems described above, currently, coagulating agents, such as lime, aluminum sulfate, ferric sulfate, and polyaluminum chloride, are used in sludge treatment processes. When coagulating agents are used, the amount of sludge is increased due to the added coagulant. Consequently, final disposal expenses for sludge associated with sewage treatment are increased. Since products formed by reactions between the coagulant and phosphate are chemically stable, they are not reusable for fertilizers. The products are contained in the dewatered sludge at the end. Therefore, when dewatered sludge is used as a raw material for cement, which has been receiving attention as a final disposal technique of sewage sludge, the cement is degraded by the phosphate. As a result, it is difficult to adopt such a final disposal technique.

SUMMARY OF THE INVENTION

It is an object of the present invention to provide a method and a system for efficiently recovering phosphate from mixed sludge.

It is another object of the present invention to provide a method and a system for recovering phosphate in a form which can be effectively used as a fertilizer.

It is another object of the present invention to provide a method and a system for recovering phosphate, in which the highly efficient recovery of phosphate is simplified.

It is another object of the present invention to provide a method and a system for recovering phosphate, in which clogging of sludge transport pipes is avoided.

It is another object of the present invention to provide a method and a system for recovering phosphate, in which phosphate are recovered from sludge with high efficiency so as to prevent treated water from affecting the environment.

According to a first aspect of the present invention, a method for recovering phosphate from sludge includes the processes of treating sludge discharged from a water treatment system at a sewage treatment plant in an anaerobic condition to release phosphate in the sludge into solution, and recovering phosphate in the solution using a seed crystal material.

The sludge includes, for example, waste sludge generated in the water treatment system, and mixed sludge of waste sludge and raw sludge.

The treatment in an anaerobic condition is performed, for example, by injecting sludge into an anaerobic tank and retaining it in the anaerobic tank for a predetermined period of time. In the treatment in an anaerobic condition, phosphate (polyphosphate) in waste sludge (solids) are subjected to hydrolysis and are released as orthophosphate into sludge solution.

Phosphate released into the solution are recovered, using a seed crystal material, for example, as hydroxyapatite crystals on the surface thereof.

As the seed crystal material, for example, a substantially spherical material containing a calcium silicate hydrate as a major constituent is used. The calcium silicate hydrate may be at least one selected from the group consisting of tobermorite, xonotlite, hillebrandite, and wollastonite. In addition to the above, a seed crystal material disclosed in Japanese Unexamined Patent Publication No. 9-308877 may be used. In this material, a calcium silicate hydrate is attached to the surface of a honeycomb core. As a seed crystal material, autoclaved lightweight concrete ALC, may also be used. In the production of ALC, a calcic material and a silicic material are used as major materials, and after water and a foaming agent are added thereto, autoclave curing is performed.

The treatment in an anaerobic condition and the recovery of phosphate may be performed separately or in the same tank.

According to a second aspect of the present invention, a method for recovering phosphate from sludge according to the first aspect of the invention further includes the process of digesting the sludge treated in an anaerobic condition in an anaerobic digestion tank, and dewatering and separating the digested sludge into dewatered sludge and liquid separated by dewatering.

After the sludge having a decreased phosphorus content is treated in the anaerobic digestion tank, dewatering is performed to achieve the separation between the dewatered sludge and the dewatering effluent. At this stage, since the phosphorus content of the digested sludge treated in the anaerobic digestion tank is preliminarily decreased, even if phosphate are released from solids of the digested sludge, the possibility of precipitation of struvite in pipes and pumps is significantly reduced.

According to a third aspect of the present invention, in a method for recovering phosphate from sludge according to one of the first and second aspects of the invention, the process of recovering phosphate using a seed crystal material includes a process of adjusting the calcium ion concentration in the solution to a range from 80 to 150 mg/l.

If the calcium ion concentration for adjusting calcium ions in the solution to be treated is less than 80 mg/l, the calcium ion concentration is insufficient, resulting in a decrease in the phosphate recovering efficiency. Even if the concentration is set at more than 150 mg/l, the efficiency is not increased, which is uneconomical. Products resulting from precipitation of calcium ions are also generated, and more sludge requiring disposal is produced.

According to a fourth aspect of the present invention, in a method for recovering phosphate from sludge according to any one of the first to third aspects of the invention, the process of recovering phosphate using a seed crystal material includes a process of adjusting the pH of the solution to a range from 7.5 to 9.0.

If the pH is less than 7.5, hydroxyapatite is not generated. If the pH exceeds 9.0, products resulting from precipitation of calcium ions are generated and hydroxyapatite microcrystals are generated in water, which are discharged from the phosphate recovering tank, resulting in a decrease in the phosphate recovery efficiency. There is also a possibility that products resulting from precipitation of calcium are generated and inorganic sludge is produced.

According to a fifth aspect of the present invention, in a method for recovering phosphate from sludge according to any one of first to fourth aspects of the invention, the treatment in an anaerobic condition is performed simultaneously with the recovery of phosphate using a seed crystal material.

According to a sixth aspect of the present invention, in a method for recovering phosphate from sludge according to the fifth aspect of the invention, the seed crystal material flows in the sludge solution.

According to a seventh aspect of the present invention, in a method for recovering phosphate from sludge according to the sixth aspect of the invention, the seed crystal material contains a calcium silicate hydrate as a major constituent and is formed in a substantially spherical shape.

According to an eighth aspect of the present invention, a method for recovering phosphate from sludge includes the process of treating sludge discharged from a water treatment system at a sewage treatment plant in an anaerobic condition to release phosphate in the sludge into solution, separating the sludge treated in an anaerobic condition into thickened sludge and thickener effluent, dewatering and separating the thickened sludge into dewatered sludge and dewatering effluent, and recovering phosphate contained in the dewatering effluent and the thickener effluent.

Thickening of the sludge may be performed by any method such as gravity thickening, floatation thickening, and centrifugal thickening. The water content in the sludge can be decreased by thickening. Thus, the phosphorus content in the thickened sludge can be decreased.

Separation by dewatering may also be performed by any method.

In this way, since phosphate are recovered both from the thickener effluent and from the dewatering effluent, the recovery rate of phosphate from the sludge can be increased.

With respect to the recovery of phosphate, in addition to the method using seed crystal material described above, rock phosphate, bone black, silica, calcite and ALC may be employed as seeding materials.

According to a ninth aspect of the present invention, a method for recovering phosphate from sludge according to the eighth aspect of the invention further includes the process of digesting the thickened sludge at an anaerobic digestion tank, and dewatering and separating the digested sludge into dewatered sludge and dewatering effluent.

After the sludge having a decreased phosphorus content is treated in the anaerobic digestion tank, dewatering is performed to achieve separation between the dewatered sludge and dewatering effluent. At this stage, since the phosphorus content of the digested sludge treated in the anaerobic digestion tank is preliminarily decreased, even if phosphorus components are released from solids of the digested sludge, the possibility of precipitation of in the pipes and pumps is significantly reduced.

According to a tenth aspect of the present invention, in a method for recovering phosphorus components from sludge according to one of the eighth and ninth aspects of the invention, the process of recovering phosphates includes a process of adjusting the calcium ion concentration in the solution to a range from 80 to 150 mg/l.

The calcium ion concentration for adjusting calcium ions in sludge slurry is preferably set at 80 to 150 mg/l. If the calcium ion concentration is less than 80 mg/l, the calcium ion concentration may be insufficient depending on the characteristics of the sludge to be treated, resulting in a decrease in the phosphate recovering efficiency. Even if the concentration is set at more than 150 mg/l, no effect is obtained and inorganic sludge is increased.

According to an eleventh aspect of the present invention, in a method for recovering phosphate from sludge according to any one of the eighth to tenth aspects of the invention, the process of recovering phosphate includes a process of adjusting the pH of the solution to a range from 7.5 to 9.0.

If the pH is less than 7.5, hydroxyapatite is not generated. If the pH exceeds 9.0, products resulting from precipitation of calcium ions are generated and hydroxyapatite microcrystals are generated in water, which are discharged out of a phosphate recovery tank, resulting in a decrease in the phosphate recovery efficiency. There is also a possibility that products resulting from precipitation of calcium are generated and inorganic sludge is produced.

According to a twelfth aspect of the present invention, in a method for recovering phosphate from sludge according to any one of the eighth to eleventh aspects of the invention, in the process of recovering phosphate, a seed crystal material is used.

As the seed crystal material, as described above, various types of materials may be used.

According to a thirteenth aspect of the present invention, in a method for recovering phosphate from sludge according to the twelfth aspect of the invention, the seed crystal material contains a calcium silicate hydrate as a major constituent and is formed in a substantially spherical shape.

According to a fourteenth aspect of the present invention, a system for recovering phosphate from sludge includes a phosphorus-releasing means for treating waste sludge drawn from a water treatment system at a sewage treatment plant in an anaerobic condition to release polyphosphate accumulated in sludge into bulk liquid, a dewatering and separating means for separating the sludge mixed liquor containing the solution including the released phosphate into dewatering effluent and dewatered sludge, a calcium ion concentration-adjusting means for adjusting the calcium ion concentration in the dewatering effluent, a pH-adjusting means for adjusting the pH of the dewatering effluent, and a means for recovering phosphate from the calcium ion concentration-adjusted, pH-adjusted effluent of dewatering process.

According to a fifteenth aspect of the present invention, a system for recovering phosphate from sludge includes a phosphoms-releasing means for treating waste sludge drawn from a water treatment system at a sewage treatment plant in an anaerobic condition to release polyphosphate accumulated in sludge into bulk liquid, a thickening means for thickening and separating the sludge mixed liquor containing the solution including the released phosphate into thickener effluent and thickened sludge, a dewatering and separating means for separating the thickened sludge into dewatering effluent and dewatered sludge, a calcium ion concentration-adjusting means for adding a water soluble calcium compound to the thickener effluent and the dewatering effluent to adjust the calcium ion concentration therein, a pH-adjusting means for adding an alkaline substance to the thickener effluent and the dewatering effluent to adjust the pH thereof, and a means for recovering phosphate from the calcium ion concentration-adjusted, pH-adjusted effluents of thickener and dewatering process.

According to a sixteenth aspect of the present invention, a system for recovering phosphate from sludge according to the fifteenth aspect of the invention further includes an anaerobic digesting means for digesting the thickened sludge.

According to a seventeenth aspect of the present invention, in a system for recovering phosphate from sludge according to any one of the fourteenth to sixteenth aspects of the invention, the means includes a seed crystal material for recovering phosphate by crystallizing reaction.

According to an eighteenth aspect of the present invention, a system for recovering phosphate from waste sludge includes a recovery tank for receiving waste sludge drawn from a water treatment system at a sewage treatment plant, a phosphorus-releasing means for treating the waste sludge in an anaerobic condition in the recovery tank to release polyphosphate into bulk liquid, a calcium ion concentration-adjusting means for adjusting the calcium ion concentration in the liquid containing phosphate, a pH-adjusting means for adjusting the pH of the liquid, and a means for recovering phosphate from the liquid.

Accordingly, an apparatus for recovering phosphate is simplified.

The releasing and recovery of phosphate in waste sludge or mixed sludge can be performed in the same tank, whereby, a thickening tank can be omitted.

According to a nineteenth aspect of the present invention, in a system for recovering phosphate from sludge according to the eighteenth aspect of the invention, the means includes a seed crystal material for recovering phosphate by crystallizing reaction.

According to a twentieth aspect of the present invention, in a system for recovering phosphate from sludge according to the nineteenth aspect of the invention, the seed crystal material comes into contact with the sludge in a fluid state for crystallization.

According to a twenty-first aspect of the present invention, a system for recovering phosphate from sludge according to any one of the eighteenth to twentieth aspects of the invention further includes a thickening means for thickening and separating the sludge dephosphorized by the dephosphorizing means into thickener effluent and thickened sludge, and an anaerobic digesting means for digesting the thickened sludge.

Accordingly, the possibility of precipitation of struvite in the transport pipes and pumps for digested sludge is reduced, thus preventing clogging of the sludge transport facility. Consequently, stable operations can be secured, and treatment efficiency for the entire sludge treatment can be improved.

According to a twenty-second aspect of the present invention, in a system for recovering phosphate from sludge according to any one of the seventeenth, and nineteenth to twenty-first aspects of the invention, the seed crystal material contains a calcium silicate hydrate as a major constituent and is formed in a substantially spherical shape.

According to a twenty-third aspect of the present invention, in a system for recovering phosphate from sludge according to the twenty-second aspect of the invention, the calcium silicate hydrate is at least one selected from the group consisting of tobermorite, xonotlite, hillebrandite, and wollastonite.

According to a twenty-fourth aspect of the present invention, in a system for recovering phosphate from sludge according to any one of the fourteenth to twenty-third aspects of the invention, the calcium ion concentration-adjusting means adjusts the calcium ion concentration to a range from 80 to 150 mg/l.

The calcium ion concentration for adjusting calcium ions in the raw water to be treated is preferably set at 80 to 150 mg/l. If the calcium ion concentration is less than 80 mg/l, the calcium ion concentration is insufficient, resulting in a decrease in the phosphate recovering efficiency. Even if the concentration is set at more than 150 mg/l, the efficiency is not increased, which is uneconomical. Products resulting from precipitation of calcium ions are also generated, and sludge to be disposed of is thereby increased.

According to a twenty-fifth aspect of the present invention, in a system for recovering phosphate from sludge according to any one of the fourteenth to twenty-fourth aspects of the invention, the pH-adjusting means adjusts the pH to a range from 7.5 to 9.0.

If the pH is less than 7.5, hydroxyapatite is not generated. If the pH exceeds 9.0, products resulting from precipitation of calcium ions are generated and hydroxyapatite microcrystals are generated in bulk liquid, which are wasted out from a phosphate recovery tank, resulting in a decrease in the phosphate recovery efficiency. There is also a possibility that products resulting from precipitation of calcium are generated and inorganic sludge is produced.

Additionally, by using calcium hydroxide, the calcium ion concentration and the pH may be simultaneously adjusted. In such a case, while crystallizing reaction of hydroxyapatite is taking place, the pH is not greatly increased, and when calcium ions are excessively increased, the pH increases. Thus, by controlling the pH within a predetermined range, calcium ions are prevented from being excessively added. Therefore, the simplification of the apparatus and a reduction in the chemical cost by use of calcium hydroxide can be achieved.

By adjusting the calcium ion amount to be added to the thickener effluent and the dewatering effluent as well as the pH, the seed crystal material can be used with high efficiency for a long period of time.

Furthermore, used seed crystal material can be reused as silicic fertilizers, phosphate fertilizers. The used seed crystal material can also be used for phosphate industry.

Since the dewatered sludge treated with the system in accordance with the present invention has a low phosphorus component content, when it is used as a raw material for cement, the degradation of cement by harmful phosphorus components can be avoided.

DESCRIPTION OF THE PREFERRED EMBODIMENTS

Preferred embodiments of the present invention will be described in detail with reference to the drawings.

Figure 1:
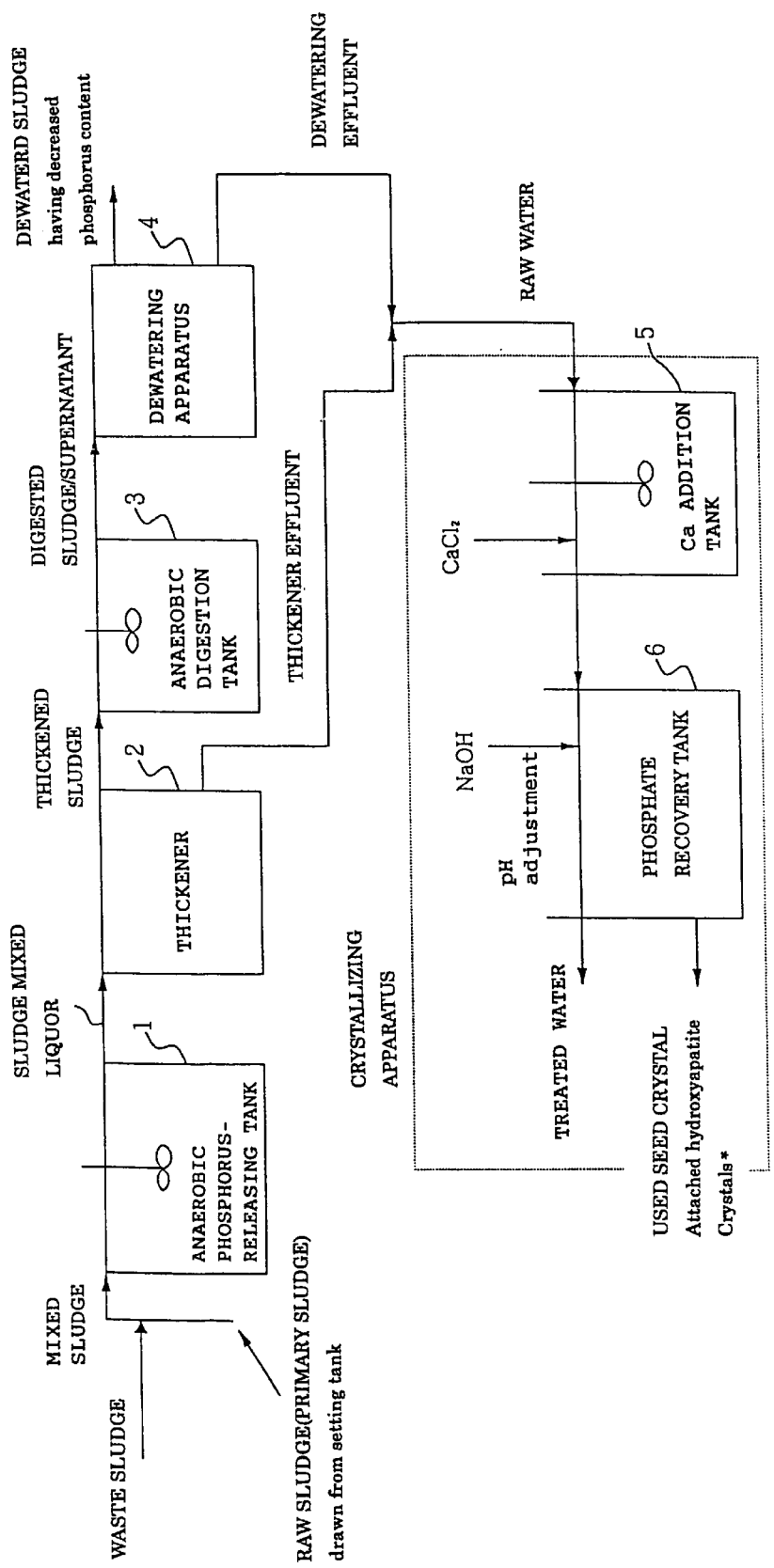
FIG. 1 is a flow sheet which shows a structure of an entire system for recovering phosphate in accordance with a first embodiment of the present invention.

FIG. 1 is a flow sheet which shows a structure of an overall system for recovering phosphate in accordance with a first embodiment of the present invention. In the drawing, numeral 1 represents an anaerobic phosphorus-releasing tank, numeral 2 represents a thickener, numeral 3 represents an anaerobic digestion tank, numeral 4 represents a dewatering apparatus, numeral 5 represents a Ca addition tank, and numeral 6 represents a phosphate recovery tank. To the anaerobic phosphorus-releasing tank 1, waste sludge or mixed sludge of waste sludge and raw sludge generated at waste water streams is supplied.

In the anaerobic phosphorus-releasing tank 1, by treating the supplied mixed sludge in an anaerobic condition, phosphorus components, in particular, polyphosphate, are released from solids of the sludge as orthophosphate into the bulk liquid.

If the mixed sludge is treated in an anaerobic condition, differing from anaerobic digestion, phosphoric ions can be released from the waste sludge in a short period of time. The target treating time for releasing is set, for example, at approximately 1 to 2 hours in the case of mixed sludge, although there are variations depending on the characteristics of the sludge. If it is less than 1 hour, the treating time is too short, resulting in insufficient release of phosphate, Although there is no particular problem if the treating time exceeds 2 hours, since an increase in the phosphate release becomes slow, the overall treatment efficiency is decreased, and the volume of the anaerobic phosphorus-releasing tank 1 becomes too large.

When the waste sludge alone is treated in an anaerobic condition, the release of phosphate is slowed in comparison with the mixed sludge, and treatment must be performed for longer than the time specified above. Therefore, by treating mixed sludge of waste sludge and raw sludge, the rise time for releasing phosphate is shortened, thus improving the treatment efficiency.

The sludge mixed liquor including the released phosphate is fed to the thickener 2, and in the thickener 2, the sludge is separated into thickened sludge and thickener effluent, for example, with a centrifugal thickener.

The thickened sludge is fed to the anaerobic digestion tank 3, and the thickener effluent is fed to the Ca addition tank 5.

In the anaerobic digestion tank 3, phosphorus as a biological constituent of the thickened sludge is digested and is dissolved into the liquid as orthophosphate, The digested sludge is fed to the dewatering apparatus 4.

In the dewatering apparatus 4, the fed digested sludge is dewatered and separated into dewatered sludge and dewatering effluent. The dewatered sludge having a decreased phosphorus content is discharged out of the system, and dewatering effluent is fed to the Ca addition tank 5.

In the Ca addition tank 5, a predetermined amount of a water soluble calcium compound (e.g., calcium chloride, CaCl2) is added to the fed liquid of thickener and dewatering effluents. As a result, the calcium ion concentration in the mixed liquid is adjusted to a range from 80 to 150 mg/l.

The mixed liquid, in which the calcium ion concentration has been adjusted as described above, is fed to the phosphate recovery tank 6. In the phosphate recovery tank 6, an alkaline agent, such as calcium hydroxide or caustic soda, is supplied so that the pH is set at 7.5 to 9.0.

A seed crystal material including a calcium silicate hydrate is stored in the phosphate recovery tank 6. In the phosphate recovery tank 6, the pH-adjusted liquid is brought into contact with the seed crystal material to generate hydroxyapatite crystals on the surface of the seed crystal material. After the seed crystal material is used for a predetermined period of time, it is replaced with new material, and thus, phosphate are recovered.

For example, the timing for replacing the seed crystal material may be determined by the point when the content of phosphorus components crystallized on the material becomes equal to the value of a phosphate fertilizer.

Figure 2:
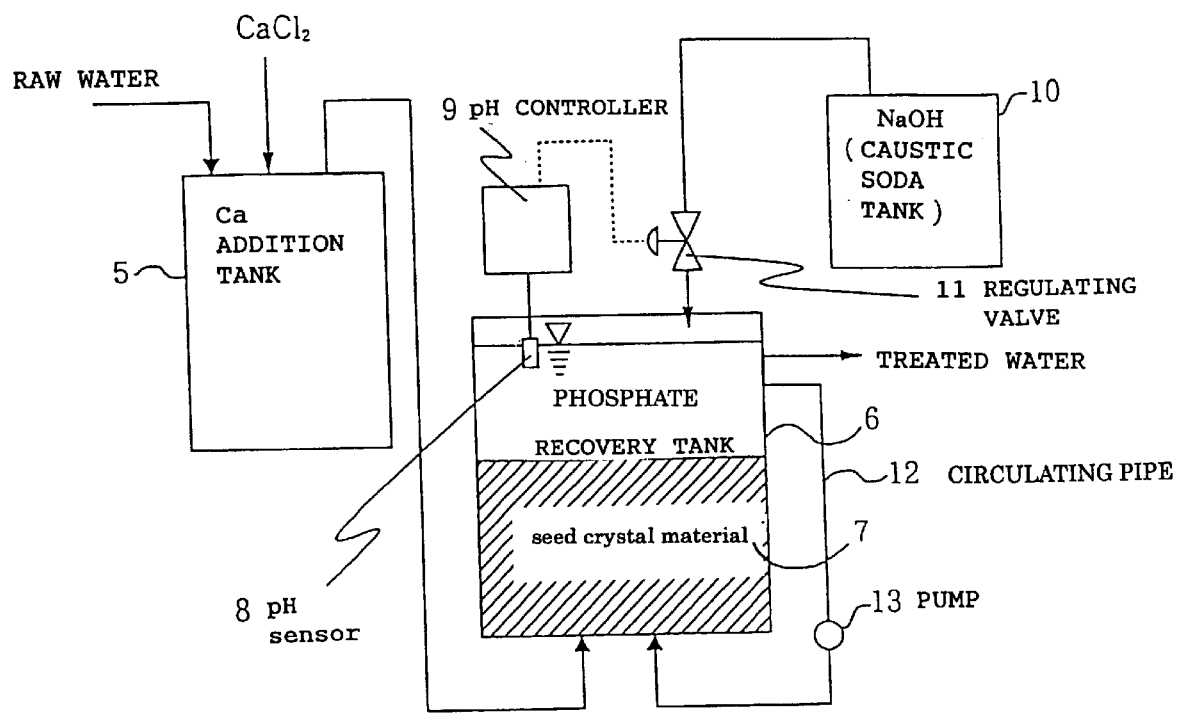
FIG. 2 is a schematic diagram which shows a phosphate recovery tank in accordance with the first embodiment.

FIG. 2 is a schematic diagram which shows the phosphate recovery tank 6 and its peripheral equipment.

As shown in the drawing, a seed crystal material 7 is stored in the phosphate recovery tank 6, and a pH sensor 8 is provided in the vicinity of the water surface. The pH sensor 8 detects the pH of the liquid, and the detected signals are input to a pH controller 9. The pH controller 9 perform operations based on the detected pH and the target value, and controls the closing and opening of a regulating valve 11. The closing and opening of the regulating valve 11 is electrically controlled. When the pH is lower than the target value, the regulating valve 11 is opened, and when the pH satisfies the target value, the valve 11 is closed. Liquid from the phosphate recovery tank 6 is circulated and supplied through a circulating pipe 12, and a circulating pump 13 is provided in the middle of the circulating pipe 12. By adjusting the flow rate of the circulated liquid with the circulating pump 13, the seed crystal material zone may be set as a fixed bed, expanded bed, or fluidized bed.

Figure 3:
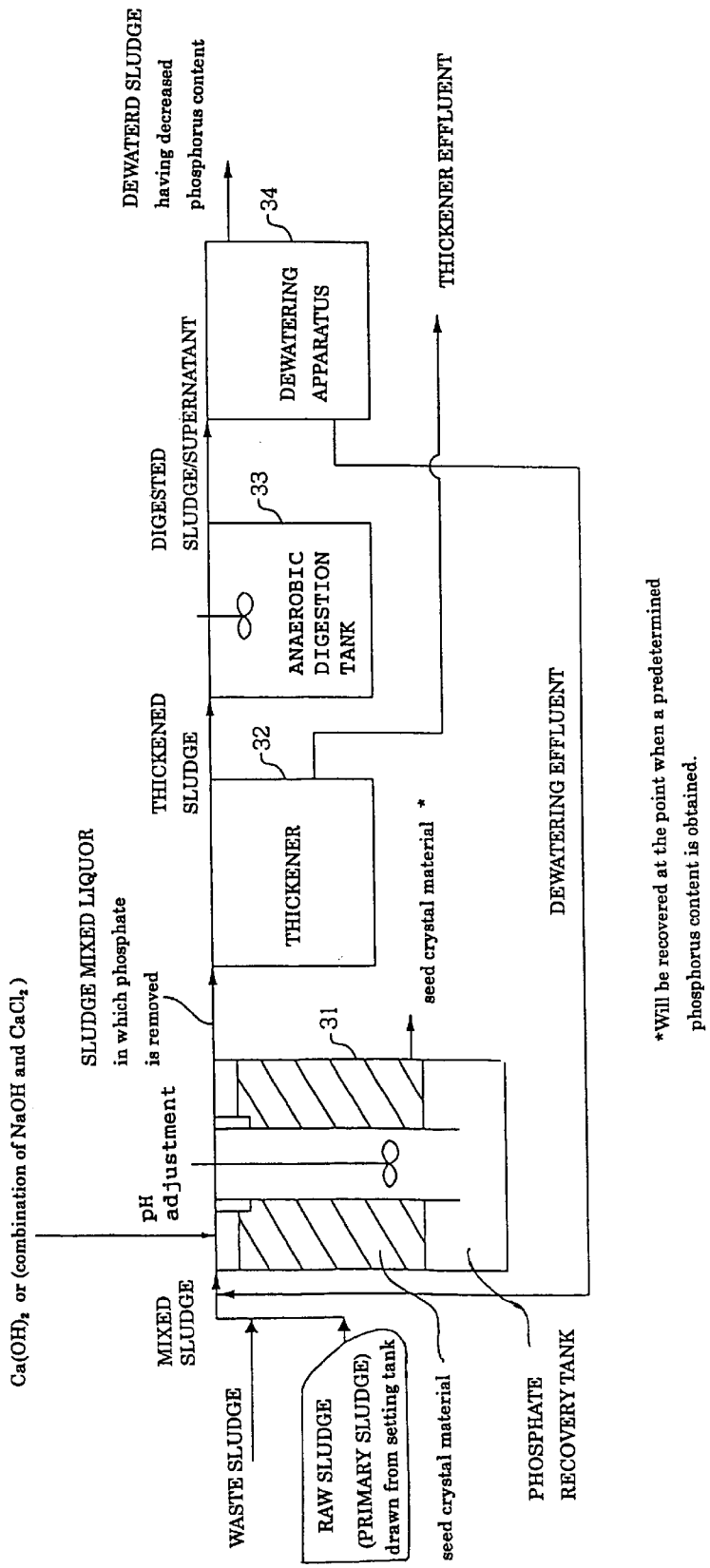
FIG. 3 is a flow sheet which shows a structure of an entire system for recovering phosphate in accordance with a second embodiment of the present invention.
Figure 4:
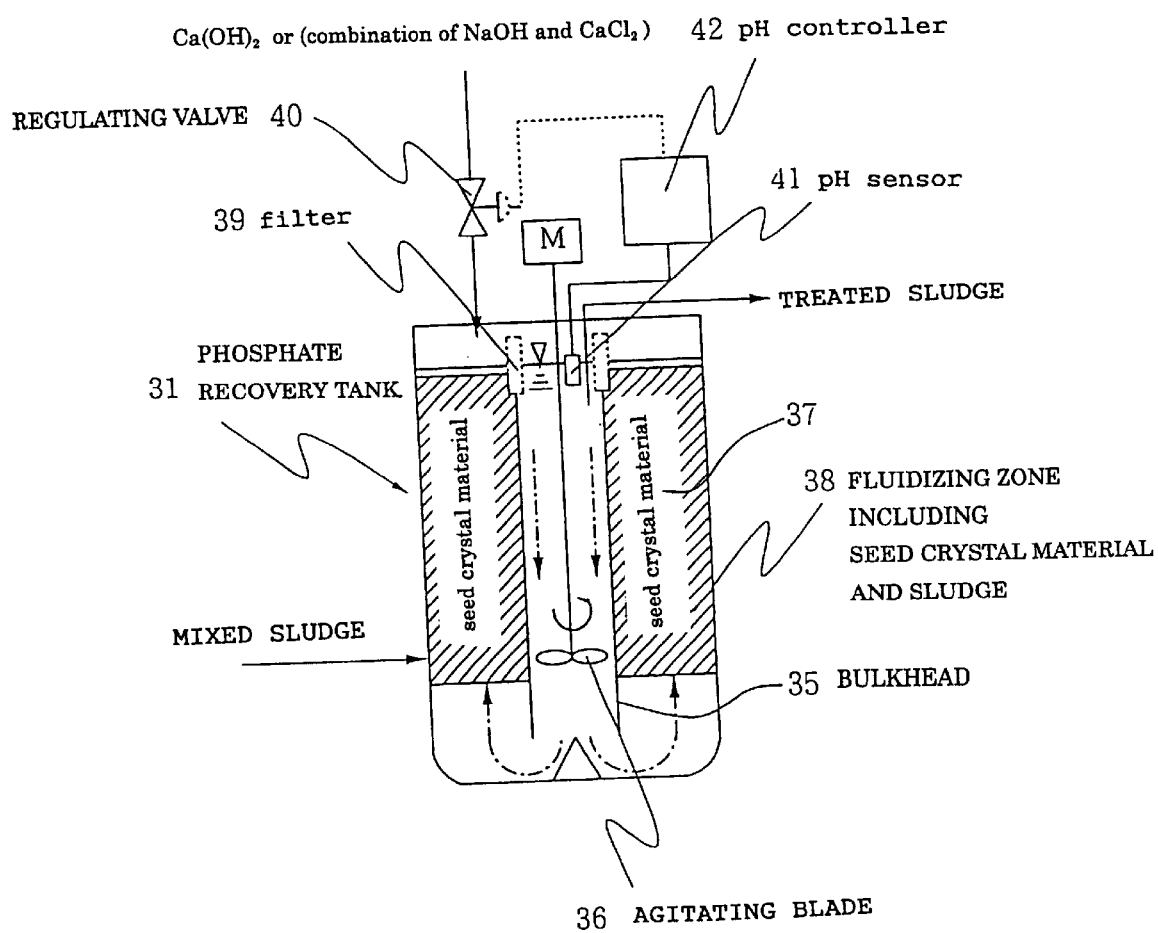
FIG. 4 is a schematic diagram which shows a phosphate recovery tank in accordance with the second embodiment.

FIGS. 3 and 4 show a second embodiment of the present invention.

In this embodiment, in a phosphate recovery tank 31 in which mixed sludge is fed, the release of phosphate in an anaerobic condition and the recovery of phosphate with a seed crystal material are simultaneously performed. The seed crystal material is kept in a fluid state in the tank 31. Ca(OH)2 is supplied to the phosphate recovery tank 31 to adjust the pH and the calcium ion concentration of the sludge mixed liquor.

The sludge mixed liquor discharged from the phosphate recovery tank 31 (mixed sludge have decreased phosphorus content) is thickened in a thickener 32 and is separated into thickened sludge and thickener effluent.

The thickened sludge is fed to an anaerobic digestion tank 33, and phosphate are further released therein. The digested sludge is dewatered at a dewatering apparatus 34 and is separated into dewatered sludge having a decreased phosphorus content and dewatering effluent. The dewatering effluent is returned to the phosphate recovery tank 31, and phosphate are recovered.

As shown in FIG. 4, in the phosphate recovery tank 31 having an anaerobic condition, a cylindrical bulkhead 35 is provided in the center of the tank, and a motor-driven agitating blade 36 is provided in the bulkhead 35. On the exterior of the bulkhead 35, a fluidizing zone 38 including a seed crystal material 37 and sludge is provided, and the seed crystal material 37 fluidizes in the sludge. By the rotation of the agitating blade 36, a downflow is generated in the bulkhead 35 in the phosphate recovery tank 31, and an upflow is generated in the outside thereof. A filter 39, for example, composed of a wire mesh cylinder, is fixed on the upper end of the bulkhead 35, and the filter 39 prevents the spherical seed crystal material 37 from flowing into the bulkhead 35. Numeral 40 represents a regulating valve for controlling the feed rate of Ca(OH)2, and numeral 41 represents a pH sensor. The detected value by the pH sensor 41 is input to a pH controller 42, and the pH controller 42 controls the closing and opening of the regulating valve 40 so that the pH of the sludge solution is controlled within a proper range. By regulating the pH at 7.5 to 9.0, the calcium ion concentration is set at approximately 80 to 150 mg/l, although there are variations depending on the characteristics of the mixed sludge.

That is, by adding calcium hydroxide to the phosphate recovery tank 31 so that the pH is in the range 7.5 to 9.0, the calcium ion concentration is set at approximately 80 to 150 mg/l.

The phosphate released from the sludge are brought into contact with the filled seed crystal material 37, and hydroxyapatite crystals are produced on the surface of the seed crystal material 37 by crystallizing reaction. After the seed crystal material in which hydroxyapatite crystals have been produced is used for a predetermined period of time, it is replaced with new agent, and thus, phosphate are recovered.

When sewage or the like containing a large amount of organic substances is treated, slimy biofilms easily form on sidewalls, bottoms, etc., of containers. It is found that when calcium silicate hydrate as seed crystal material is immersed in sludge mixed liquor for a long period of time, biofilms do not form on the surface of the seed crystal material, although biofilms will form on the sidewalls of the container. Therefore, in this embodiment, release of phosphate in an anaerobic condition in the first embodiment and recovery of phosphate with a seed crystal material are simultaneously performed in the same tank, thus simplifying equipment.

In the phosphate recovery tank 31, in an anaerobic condition, polyphosphate accumulated in the fed sludge are released into the bulk liquid. Subsequently, the liquid is brought into contact with the seed crystal material 37 in the tank. If the immobile or nearly immobile seed crystal material is brought into contact with the liquid, resistance increases when sludge passes through the seed crystal material zone, and separation of sludge and solution occurs, resulting in clogging in the phosphate recovery tank. Therefore, in the phosphate recovery tank 31, preferably, a granular seed crystal material 37 is filled up, and it is, in a broad sense, in a fluid state (including a fountaining state), in which the seed crystal material 37 flows according to the flow of the liquid. The fluidization conditions, etc., depend on factors such as specific gravity and particle size of the seed crystal material to be used, and on viscosity of the liquid.

The method for producing such a seed crystal material includes a step of granulating by tumbling, using powder made of a silicic material and powder made of a calcic material (for example, producing spherules having diameters of approximately 1 to 15 mm), a process of curing the granulated material in moist air, and a process of autoclave curing (for example, curing in an autoclave at 180° C., at 10 atm). As the silicic material and calcic material, preferably, silica, diatom earth, acid earth, blast furnace slag, fly ash, cement, gypsum, calcined lime, or the like is used. The autoclave curing is a curing method which is primarily used for concrete products, in which pressure and heat effects of saturated steam are used together.

The seed crystal material is in a substantially spherical shape, and a calcium silicate hydrate as the precipitation site for hydroxyapatite is formed on the entire surface thereof. Therefore, the contact area of the calcium silicate hydrate as the precipitation site for hydroxyapatite with water containing phosphate is increased, resulting in significantly high efficiency of phosphate adsorption.

Figure 5:
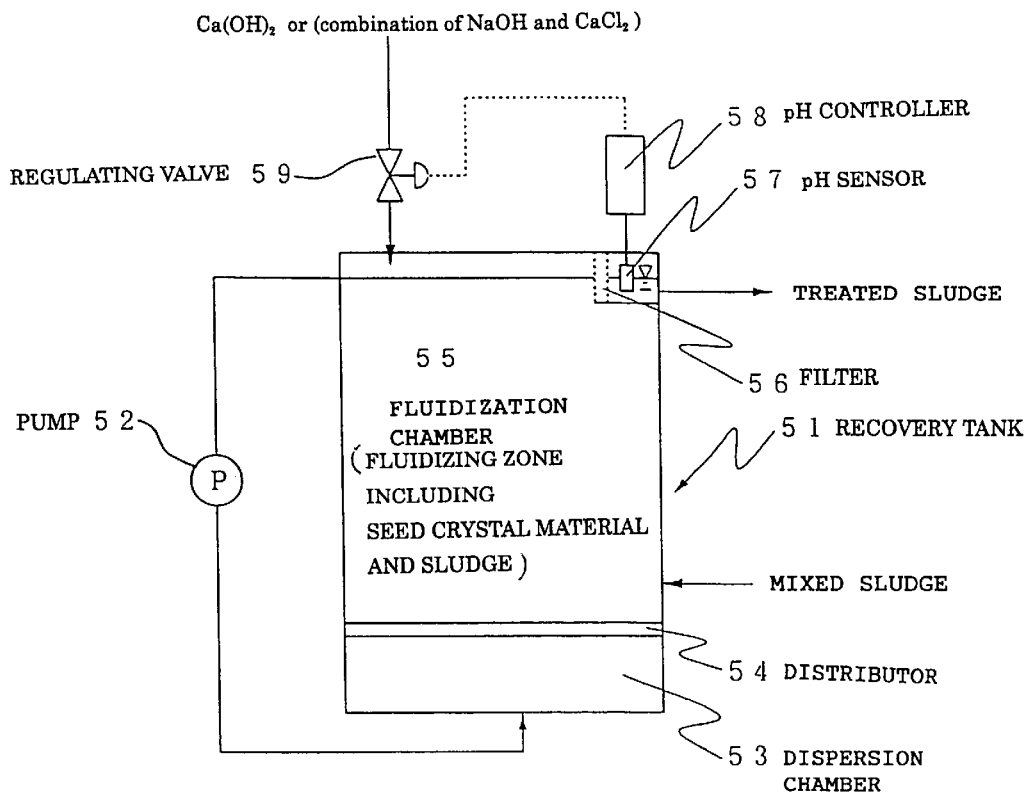
FIG. 5 is a schematic diagram which shows a phosphate recovery tank in accordance with a third embodiment of the present invention.

A third embodiment of the present invention is shown in FIG. 5.

In this embodiment, a fluidizing zone is formed without using an agitating blade.

Sludge fed to a phosphate recovery tank 51 is forced to be fed into a dispersion chamber 53 in the recovery tank 51 by a pump 52. The sludge is fed to a fluidization chamber 55 through a distributor (perforated plate) 54 provided on the top of the dispersion chamber 53. A seed crystal material is filled in the fluidization chamber 55, and a fluidizing zone is formed by fountaining of the sludge fed through the distributor 54. Numeral 56 represents a filter, numeral 57 represents a pH sensor, numeral 58 represents a pH controller, and numeral 59 represents a regulating valve for a pipe for feeding calcium hydroxide.

An upflow is generated by forcibly circulating the sludge slurry by the pump 52, and crystallization is performed in the fluidization chamber 55. By recovering the seed crystal material, phosphate released from the sludge are recovered.

Figure 6:
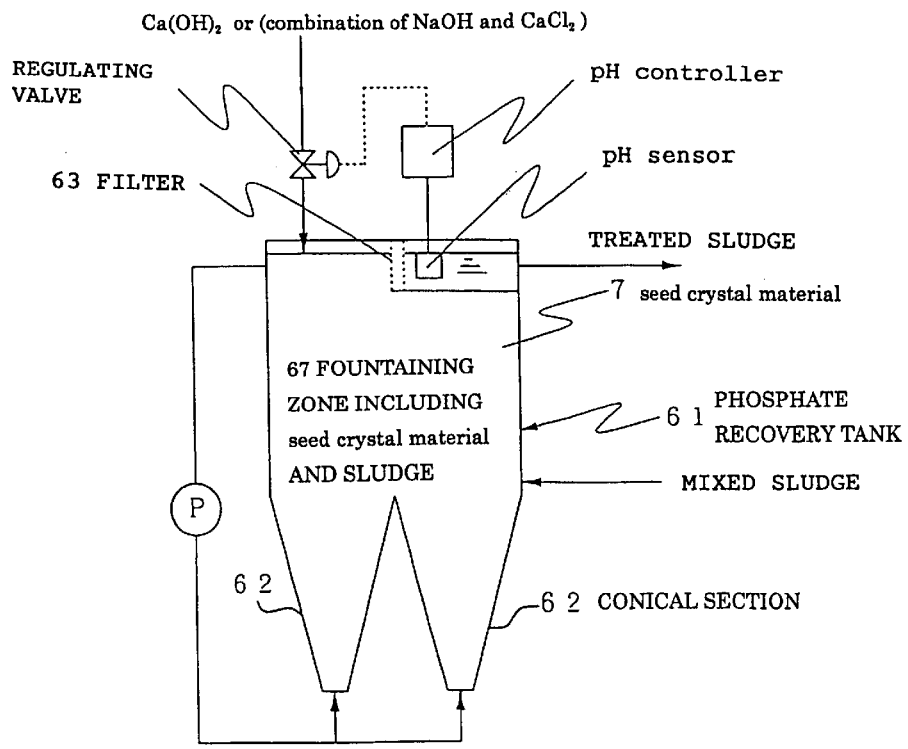
FIG. 6 is a schematic diagram which shows a phosphate recovery tank in accordance with a fourth embodiment of the present invention.

A fourth embodiment of the present invention is shown in FIG. 6.

In this embodiment, conical sections 62 are provided on the bottom of a phosphate recovery tank 61, and circulated sludge is fed to the bottoms of the conical sections 62 to fluidize a seed crystal material 7 filled in the tank 61. The method for removing phosphate, etc., is the same as that in the third embodiment shown in FIG. 5.

Although not shown in the drawing, if the diameter is gradually increased toward the top of the recovery tank, the flow rate in the tank is gradually decreased, thus ceasing the formation of the fluidizing zone. Therefore, the seed crystal material and sludge are separated from each other, and the load of a separating filter provided on the top can be reduced.

Additionally, methods for recovering phosphate from sludge and systems therefor in accordance with the present invention are applicable to waste water streams of biological phosphorus removal processes. For example, in the anaerobic-aerobic activated sludge process, by using a phosphate recovery tank in accordance with the present invention as an anaerobic tank itself or between an anaerobic tank and an aerobic tank, the concentration of phosphate to be fed to the aerobic tank can be reduced by treating the phosphate released from return sludge in the anaerobic tank with a seed crystal material. As a result, the phosphate concentration in the effluent discharged from the sewage treatment system can be reduced.

The present invention will be further described based on specific experimental examples.

EXPERIMENTAL EXAMPLE 1

Phosphate Release in Anaerobic Condition

Raw sludge and waste sludge (phosphorus content: 4.0%) generated at a sewage treatment plant were collected, and mixed sludge (phosphorus content: 2.5%) in which the raw sludge and the waste sludge were mixed at a ratio of 1:1, on the dry weight basis, and the waste sludge wore mod as samples. Each sample was filled in a 500 ml Erlenmeyer flask, and the flask was closed. The sample in the flask was stirred with a laboratory stirrer for 30 minutes, 60 minutes, 90 minutes, 150 minutes, 240 minutes, and 24 hours, followed by filtration. The orthophosphate concentration in the filtrate was measured, and the phosphate release rate at each point in the 24 hour-released amount was calculated. The results thereof are shown in Table 1.

TABLE 1

| Change in Phosphate Release with Time | | | | | |
|---|---|---|---|---|---|
| Phosphate | Stirring time (minutes) | | | | |
| release rate (%) | 30 | 60 | 90 | 150 | 240 |
| Mixed sludge | 36 | 58 | 70 | 85 | 87 |
| waste sludge | 3 | 5 | 6 | 10 | 15 |

As is obvious from the above results, if the time for treating mixed sludge in an anaerobic condition is set at 30 minutes, the release rate of orihophosphate is insufficient, and if the time exceeds 60 minutes, approximately 50 to 80% of the releasable phosphorus in the sludge can be released.

When waste sludge alone is treated, in comparison with mixed sludge, a treating time nearly ten times longer would be required. Therefore, the target treating time for mixed sludge in an anaerobic phosphorus-releasing tank is set at approximately 1 to 2 hours.

EXPERIMENTAL EXAMPLE 2

Crystallization in Expanded Bed

Thick, dewatered filtrate of mixed sludge of waste sludge and raw sludge (suspended solid concentration: approximately 100 mg/l, orthophosphate concentration: 50 mg/l) was treated with an experimental apparatus shown in FIG. 2. The flow rate of a circulating pump 13 was controlled so that an expanded bed with an expansion coefficient of 125% was formed. The thick, dewatered filtrate was supplied so that the space velocity was 1/hour. A calcium silicate hydrate (average particle size: 1.2 mm, maximum diameter: 2.4 mm, bulk density: 1.2) as seed crystal material was filled in the reaction section of the apparatus, and an expanded bed was formed.

Figure 7:
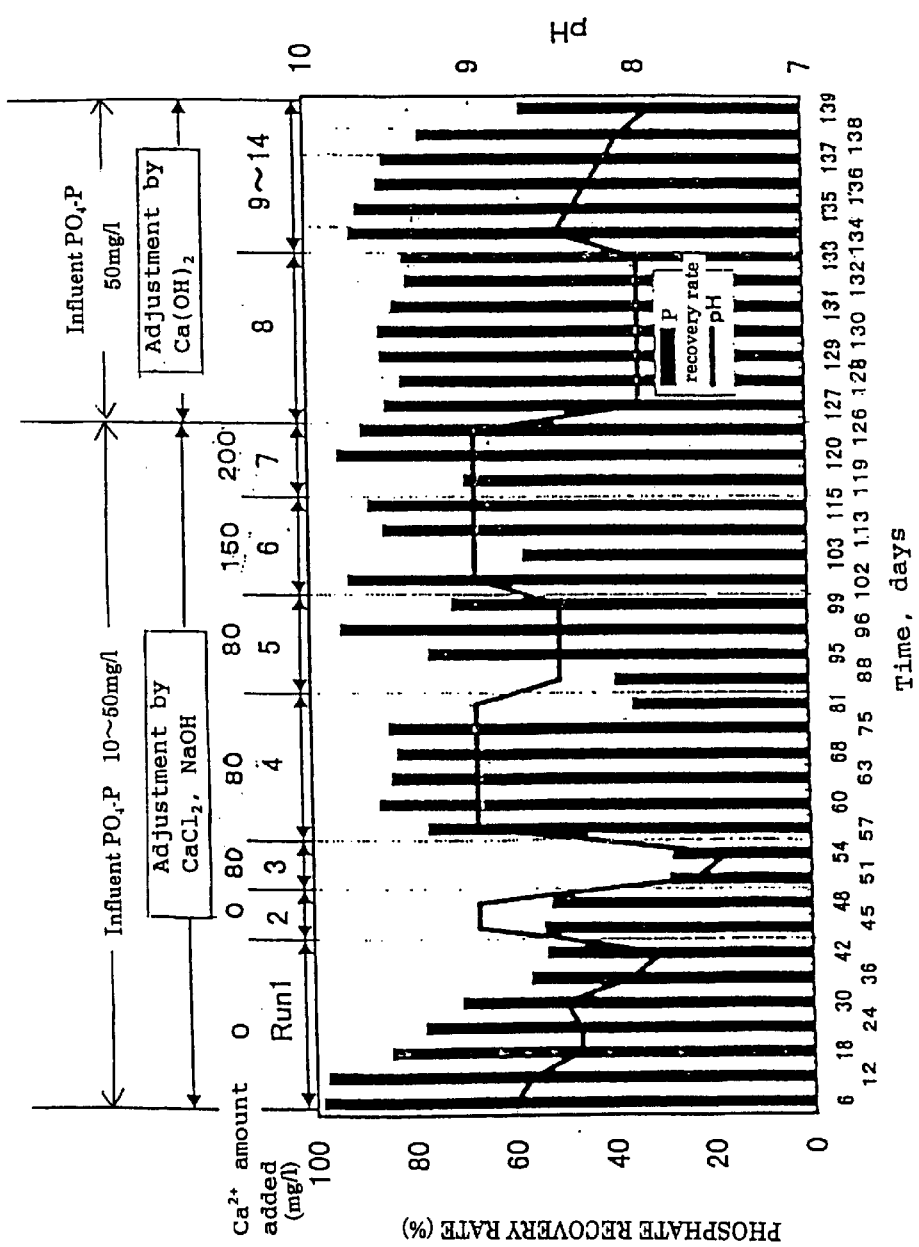
FIG. 7 is a graph for an experimental example of the present invention.

By adding thereto one of calcium hydroxide, calcium chloride, and sodium hydroxide, or a combination of calcium chloride and sodium hydroxide, the calcium ion concentration and the pH of the solution in the reaction section were varied, and phosphate recovery rates under these conditions were observed. The results are shown in FIG. 7.

As is clear from the results, when the pH is 7.5, 8.0, 8.5, and 9.0, the recovery rate is 30%, 80%, 90%, and 90%, respectively.

When the pH is less than 7.5, it is too low for crystallizing reaction of hydroxyapatite. It is confirmed that when the pH is 8.0, the phosphate recovery rate ranges from 80 to 90%. It is confirmed that when the pH is adjusted to a value more than 9.0, hydroxyapatite microcrystals are generated in mixed liquid, resulting in a difficulty in crystallizing hydroxyapatite on the surface of the seed crystal material.

When the calcium ion concentration is 80, 150, and 200 mg/l, there is no difference in the phosphorus recovery rate, and thus, it is determined that there is no particular problem if approximately 150 mg/l and 80 mg/l are set as required maximum and minimum, respectively.

Additionally, it is also found that when the pH adjusted by calcium hydroxide is 8.0 to 9.0, the calcium ion concentration is 110 mg/l, which is within the preferable concentration range of 80 to 150 mg/l.

EXPERIMENTAL EXAMPLE 3

Crystallization in Fluidized Bed

Figure 8:
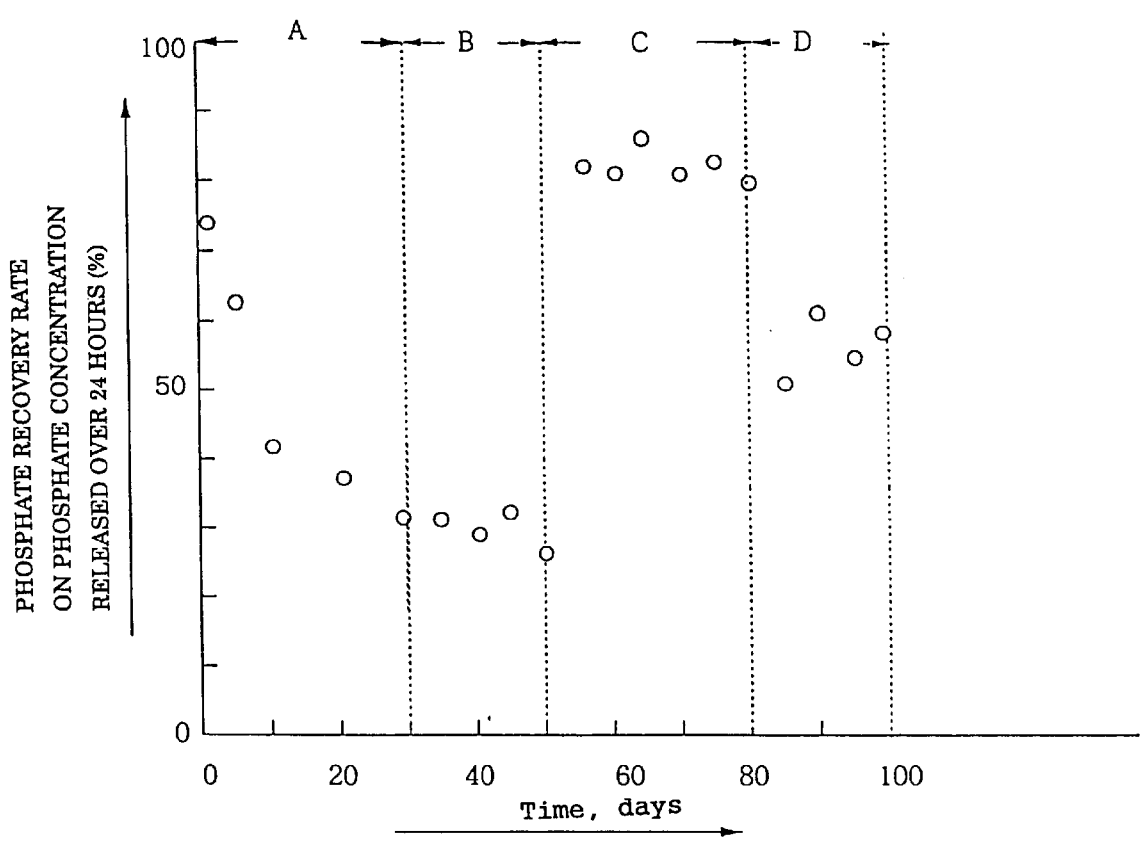
FIG. 8 is a graph for another experimental example of the present invention.
Figure 9:
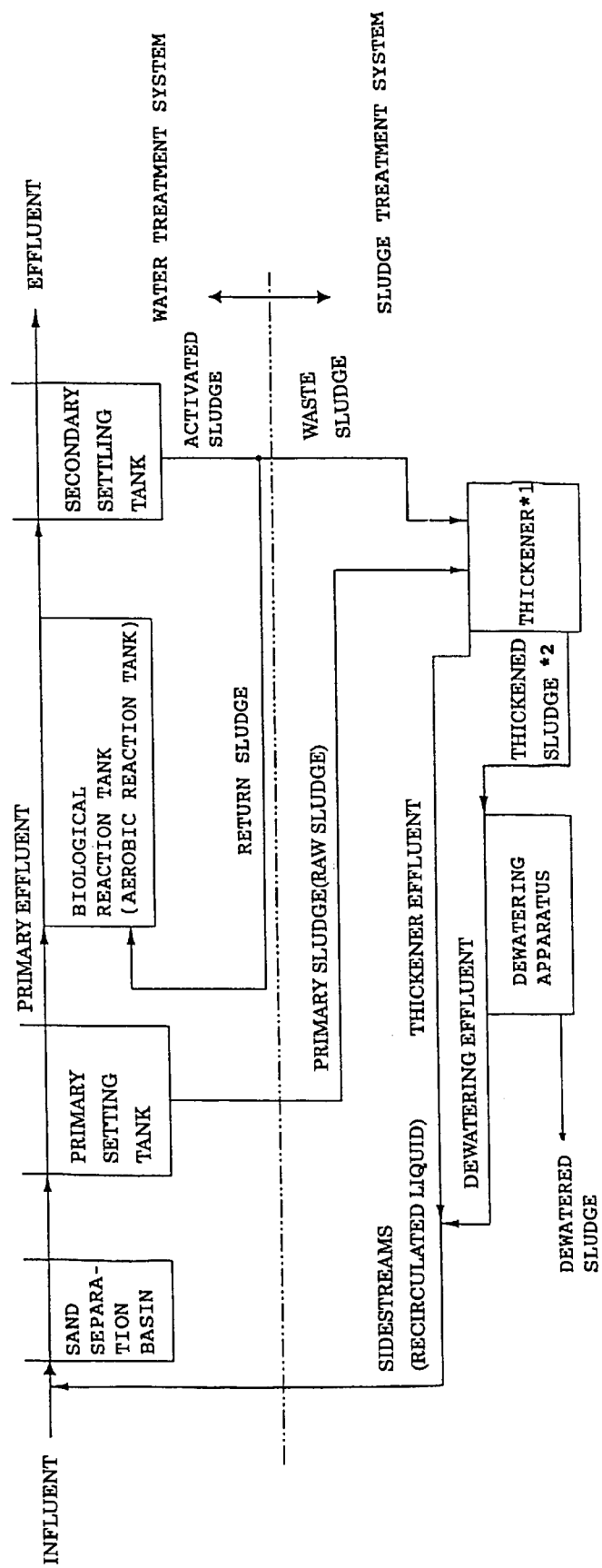
FIG. 9 is a flow sheet which shows a conventional sludge treatment system.

Mixed sludge of waste sludge and raw sludge (suspended solids concentration: approximately 7,000 mg/l, phosphorus content: 2.4%, total phosphorus concentration: 170 mg/l, phosphorus concentration released over 24 hours: approximately 50 mg/i) was treated with an experimental apparatus shown in FIG. 4. The sludge was supplied so that the retention time was 120 minutes. A calcium silicate hydrate (average particle size: 1.2 mm, maximum diameter: 2.4 mm, bulk density: 1.2) as seed crystal material was filled in the reaction section of the apparatus, and a fluidizing zone was formed. Calcium hydroxide was added thereto and the pH was adjusted to be 7.5 to 8.5. Sludge samples were collected after predetermined numbers of days, and the phosphate recovery rates on the phosphate concentrations released over 24 hours were obtained. The results are shown in FIG. 8.

As is clear from the results, when the pH is 7.5 and 8.5, the recovery rate is approximately 30% and 60%, respectively.

It is confirmed that when the pH is less than 7.5, it is too low for crystallizing reaction of hydroxyapatite, and that when the pH is 8.0, the phosphate recovery rate is approximately 80 to 90%. It is confirmed that when the pH is adjusted to a value above 8.5, hydroxyapatite microcrystals are generated in mixed liquid, resulting in difficulty in crystallizing hydroxyapatite on the surface of the seed crystal material.

Additionally, at experimental level D, products resulting from precipitation were observed in the calcium adjustment tank. Therefore, it is obvious that the calcium ion concentration at this level corresponds to excessive addition.

What is claimed is:

1. A method for recovering phosphate from sludge, comprising the process of:
    treating sludge drawn from a water treatment system at a sewage treatment plant in an anaerobic condition to release polyphosphate accumulated in the sludge into bulk liquid; and
    recovering phosphate in the solution using a material comprising a calcium silicate hydrate as a major constituent and formed in a substantially spherical shape.

2. A method for recovering phosphate from sludge according to claim 1, further comprising the processes of:
    digesting the sludge treated in an anaerobic digestion tank; and
    dewatering and separating the digested sludge into dewatered sludge and dewatering effluent.

3. A method for recovering phosphate from sludge according to claim 1, wherein the process of recovering phosphate using the material comprises a process of adjusting the calcium ion concentration in the solution to a range from 80 to 150 mg/l.

4. A method for recovering phosphate from sludge according to claim 1, wherein the process of recovering phosphate using the material comprises a process of adjusting the pH of the solution to a range from 7.5 to 9.0.

5. A method for recovering phosphate from sludge according to claim 1, wherein the treatment in the anaerobic condition is performed simultaneously with the recovery of phosphate using the material.

6. A method for recovering phosphate from sludge according to claim 5, wherein the material flows in the sludge solution.

7. A method for recovering phosphate from sludge, comprising the processes of:
    treating sludge drawn from a water treatment system at a sewage treatment plant in an anaerobic condition to release polyphosphate accumulated in the sludge into solution;
    separating the sludge treated in the anaerobic condition into thickened sludge and dewatering effluent by thickening;
    dewatering and separating the thickened sludge into dewatered sludge and dewatering effluent; and
    recovering phosphate contained in the dewatering effluent and the thickener effluent using a material comprising calcium silicate hydrate as a major constituent and formed in a substantially spherical shape.

8. A method for recovering phosphate from sludge according to claim 7, further comprising the processes of:
    digesting the thickened sludge in an anaerobic digestion tank; and
    dewatering and separating the digested sludge into dewatered sludge and dewatering effluent.

9. A method for recovering phosphate from sludge according to claim 7, wherein the process of recovering phosphate comprises a process of adjusting the calcium ion concentration in the solution to a range from 80 to 150 mg/l.

10. A method for recovering phosphate from sludge according to claim 7, wherein the process of recovering phosphate comprises a process of adjusting the pH of the solution to a range from 7.5 to 9.0.

* * * * *

UNITED STATES PATENT AND TRADEMARK OFFICE
CERTIFICATE OF CORRECTION

PATENT NO.    : 6,338,799 B1
DATED         : January 15, 2002
INVENTOR(S)   : Fukushima et al.

It is certified that error appears in the above-identified patent and that said Letters Patent is hereby corrected as shown below:

<u>Title page,</u>
Item [75], Inventors' names should read:
-- [75]  Inventors:  Yuichi Fukushima; Tadashi Matsumoto, both of Omiya-shi; Kouichi Kawabata, Tokyo; Yuichiro Abe, Kitakyushu-shi; Katsumi Moriyama, 1-10-2 Mainosato, Koga, Fukuoka 811-3114, all of (JP) --

Signed and Sealed this

Eighteenth Day of March, 2003

JAMES E. ROGAN
*Director of the United States Patent and Trademark Office*